United States Patent
Quintero

(10) Patent No.: US 10,354,313 B2
(45) Date of Patent: Jul. 16, 2019

(54) EMPHASIZING COMMUNICATION BASED ON PAST INTERACTION RELATED TO PROMOTED ITEMS

(71) Applicant: MICROSOFT TECHNOLOGY LICENSING, LLC, Redmond, WA (US)

(72) Inventor: Megan Quintero, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 512 days.

(21) Appl. No.: 15/138,454

(22) Filed: Apr. 26, 2016

(65) Prior Publication Data

US 2017/0308949 A1 Oct. 26, 2017

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0202* (2013.01); *G06Q 30/0224* (2013.01); *G06Q 30/0255* (2013.01); *G06Q 30/0641* (2013.01)

(58) Field of Classification Search
CPC . G06Q 30/0601–0645; G06Q 30/0631; G06Q 30/0202; G06Q 30/255; G06Q 30/0641; G06Q 30/0224
See application file for complete search history.

(56) References Cited

U.S. PATENT DOCUMENTS

| | | | |
|---|---|---|---|
| 8,095,613 | B1 | 1/2012 | Perkowitz et al. |
| 9,384,502 | B2 * | 7/2016 | Guo ............. G06Q 10/107 |
| 2006/0195785 | A1 | 8/2006 | Portnoy et al. |
| 2009/0228340 | A1 | 9/2009 | Bohannon |
| 2010/0075638 | A1 * | 3/2010 | Carlson ............. H04L 51/14 |
| | | | 455/412.1 |
| 2010/0235447 | A1 | 9/2010 | Goodman et al. |

(Continued)

OTHER PUBLICATIONS

Kushmerick, Nicholas, Automated Email Activity Management: An Unsupervised Learning Approach, IUI'05, Jan. 9-12, 2005, pp. 67-74) (Year: 2005).*

(Continued)

*Primary Examiner* — William J Allen
*Assistant Examiner* — Maria S. P. Heath
(74) *Attorney, Agent, or Firm* — Michael Best & Friedrich LLP

(57) ABSTRACT

A communication is emphasized based on a past interaction related to promoted items. A communication application initiates operations to process a previous communication associated with an item upon receiving a communication from a provider associated with the item. The previous communication includes an order and/or shipping confirmation associated with a past purchase of the item by a recipient of the communication. Next, the item is identified as an item of interest for the recipient based on the previous communication, a recipient attribute, and/or an item attribute. The communication is also assigned to a list of communications to be emphasized based on the identification of the item as the item of interest. Furthermore, the communication is provided to a client application to be presented to the recipient with an emphasis.

20 Claims, 8 Drawing Sheets

(56) References Cited

U.S. PATENT DOCUMENTS

| | | |
|---|---|---|
| 2012/0066615 A1 | 3/2012 | Brugler et al. |
| 2012/0203632 A1 | 8/2012 | Blum et al. |
| 2012/0323663 A1* | 12/2012 | Leach ................ G06Q 30/0239 |
| | | 705/14.25 |
| 2013/0024525 A1 | 1/2013 | Brady et al. |
| 2015/0032526 A1* | 1/2015 | Calman .............. G06Q 30/0631 |
| | | 705/14.25 |
| 2015/0032538 A1 | 1/2015 | Calman et al. |
| 2015/0033141 A1 | 1/2015 | Mishra |
| 2015/0106741 A1 | 4/2015 | Friend et al. |
| 2015/0142896 A1 | 5/2015 | Buchanan |

OTHER PUBLICATIONS

"International Search Report and Written Opinion Issued in PCT Application No. PCT/US2017/027086", dated Jun. 16, 2017, 12 Pages.

* cited by examiner

EMPHASIZING COMMUNICATION BASED ON PAST INTERACTION RELATED TO PROMOTED ITEMS

BACKGROUND

Information collection, management, and analysis have changed work processes associated communication management and product purchase. Automation and improvements in work processes have expanded scope of capabilities offered by businesses. With the development of faster and smaller electronics execution of mass processes at purchase analysis systems have become feasible. Indeed, analysis work at data centers, data warehouses, data workstations have become common business features in modern work environments. Such systems execute a wide variety of applications ranging from enterprise resource management applications to complicated purchase tools. Many such applications process purchase data to attempt to improve communications associated with purchase of products. Email as a communication platform offers an intersect between past purchases and future purchase predictions based on the past purchases.

Vast number of provider sources and product types complicate product purchase. Indeed, fast changing dynamics of product market may cause difficulties in making the correct choices in timely product purchase at market values. Complications with multiple provider sources, product types, and complexity of the product offers may lead to mismanagement of product related communication and underutilization of offers to purchase products by interested parties.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to emphasizing a communication based on past interaction related to promoted items. A communication application, according to embodiments, may receive a communication from a provider associated with an item. Next, a previous communication associated with an item may be processed. The previous communication may include an order confirmation and/or a shipping confirmation associated with the item purchased by a recipient of the communication. The item may be identified as an item of interest for the recipient based on the previous communication, a recipient attribute, and an item attribute. The communication may be assigned to a list of communications to be emphasized based on the identification of the item as the item of interest. Furthermore, the communication may be provided to a client application to be presented to the recipient with an emphasis.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
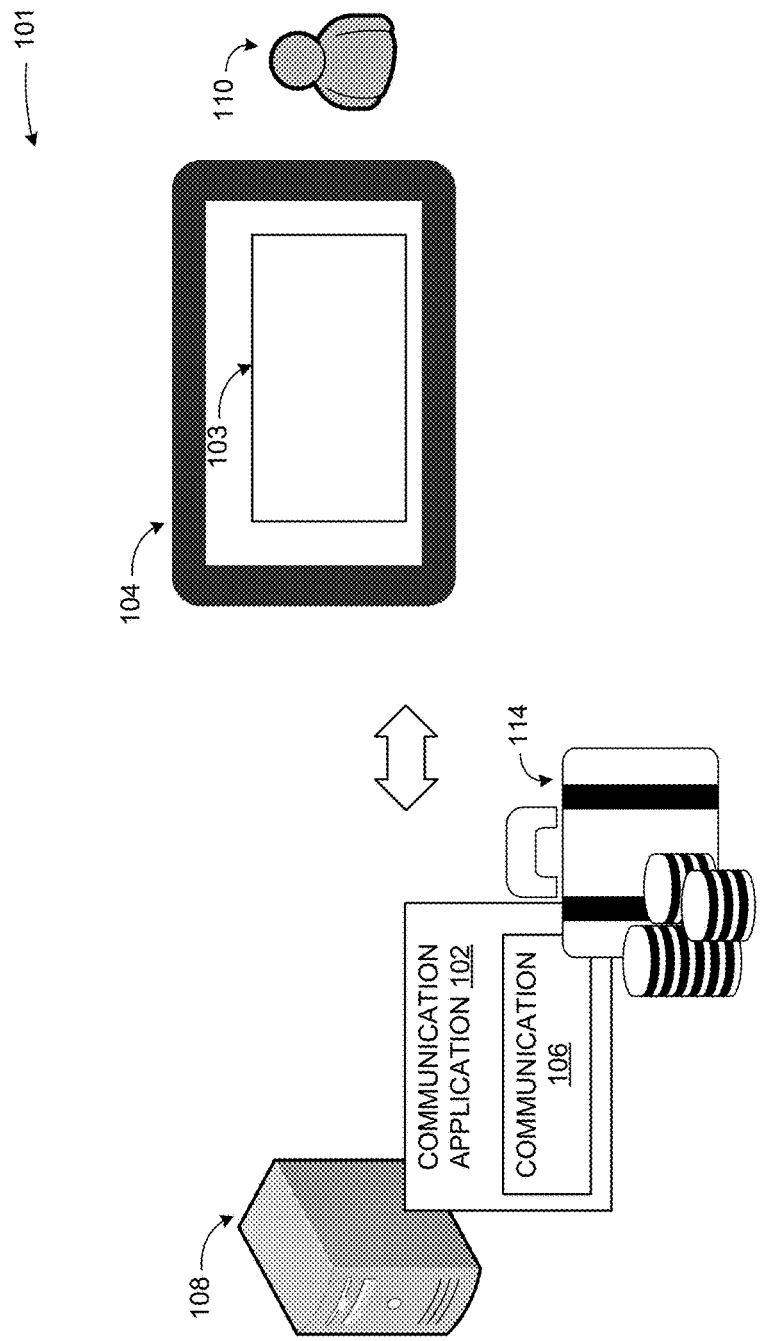
FIG. 1A through 1B are conceptual diagrams illustrating examples of emphasizing a communication based on past interaction related to promoted items, according to embodiments.

As briefly described above, a communication may be emphasized based on past interaction related to promoted items by a communication application. In an example scenario, the communication application may receive the communication from a provider associated with an item. The communication may include an offer related to the item such as a product of a vendor. The offer may include a discount, a sale, and/or a payment plan, among others.

Next, a previous communication associated with the item may be processed. The previous communication may be selected based on content of the previous communication, which may include an order confirmation, and/or a shipping confirmation associated with the item purchased by a recipient of the communication. The previous communication may share a common modality (such as email) with the communication or may include an alternative modality such as email, text based message, audio message, and/or video message, among others.

The item may be identified as an item of interest for the recipient based on the previous communication, a recipient attribute, and/or an item attribute. An example of the recipient attribute may include a gender, an age, and/or an income level of the recipient, among others. An item attribute may include a onetime purchasable, a consumable, and/or an owner customization, among others. Furthermore, the communication may be assigned to a list of communications to be emphasized based on the identification of the item as the item of interest. Additionally, the communication is provided to a client application to be presented to the recipient with an emphasis.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to emphasize a communication based on past interaction related to promoted items. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1B:
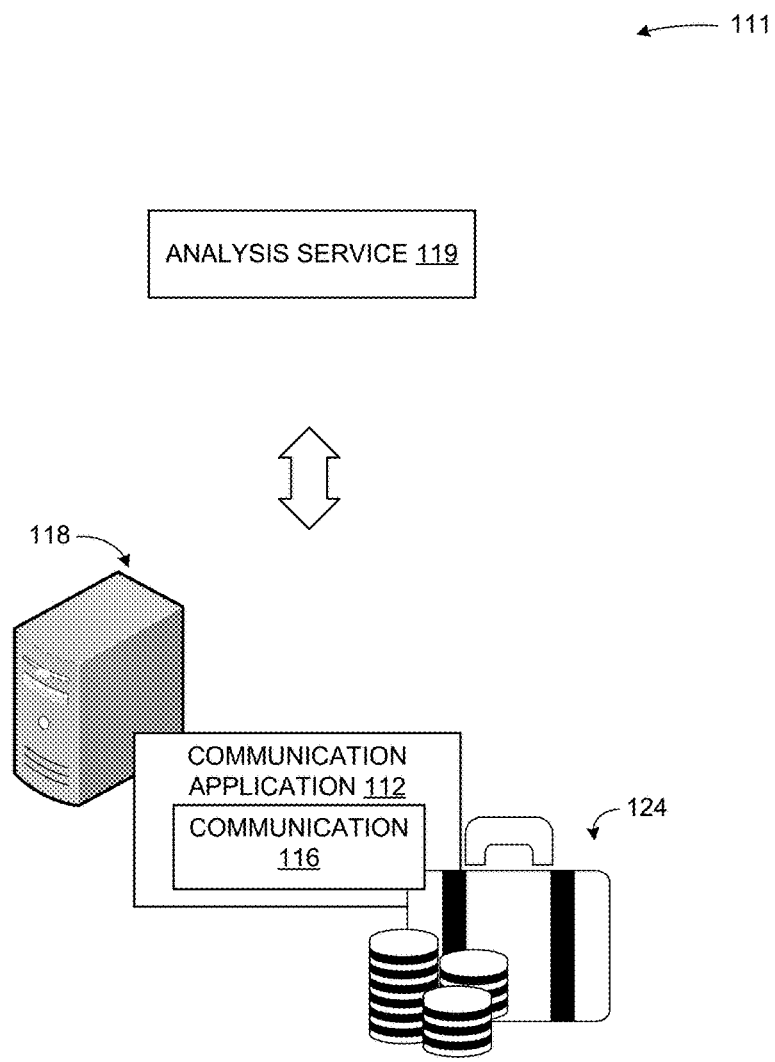

FIG. 1A through 1B are conceptual diagrams illustrating examples of emphasizing a communication based on past interaction related to promoted items, according to embodiments.

In a diagram 101, a server 108 may execute a communication application 102. The server 108 may include a physical server providing service(s) and/or application(s) to client devices. A service may include an application performing operations in relation to a client application and/or a subscriber, among others. The server 108 may include and/or is part of a workstation, a data warehouse, and/or a data center, among others.

The server 108 may execute the communication application 102. The communication application 102 may initiate operations to emphasize a communication 106 upon receiving the communication 106 from a provider associated with an item 114. In the example configuration of FIG. 1A, the provider may include a vendor. The item 114 may include a product of the vendor. Upon receiving the communication 106, the communication application 102 may process a previous communication associated with the item 114. The previous communication may include an order confirmation and/or a shipping confirmation associated with the item 114 purchased previously by a recipient 110 of the communication 106.

Next, the item 114 may be identified as an item of interest for the recipient based on the previous communication, an attribute associated with the recipient 110, and/or an attribute associated with the item 114. An attribute of the recipient 110 such as frequency of purchasing the item 114 or an attribute of the item such as a consumable may be analyzed to classify the item 114 as an item of interest. Furthermore, upon classifying the item 114 as the item of interest, the communication 106 may be assigned to a list of communications to be emphasized. The communication 106 may include an offer associated with the item 114 which the recipient may have an interest in acquiring the item 114. In addition, the communication 106 may include information associated with an interest in purchasing content, a brand, and/or an organization, among others associated with the item 114. Moreover, the communication may be provided to a client application 102 to be presented to the recipient 110 with an emphasis. The client application 103 executing in a client device 104 may be instructed to present the communication 106 within an interest category to inform the recipient 110. The client application 103 may also be prompted to suggest content associated with the item 114 and/or the item 114 available for purchase based on a spending pattern associated with the recipient 110. For example, the item 114 may be suggested for purchase at a timeslot in which the recipient 110 may be determined to be in need of the item 114 based the spending pattern of the recipient 110.

The server 108 may communicate with the client device 104 through a network. The network may provide wired or wireless communications between nodes such as the client device 104, or the server 108, among others. Previous example(s) to emphasizing the communication 106 based on past interaction related to promoted items are not provided in a limiting sense. Alternatively, the communication application 102 may manage the communication 106 at a desktop application, a workstation application, and/or a server application, among others. The client application may also include a client interface of the communication application 102.

The recipient 110 may interact with the client application 103 with a keyboard based input, a mouse based input, a voice based input, a pen based input, and a gesture based input, among others. The gesture based input may include one or more touch based actions such as a touch action, a swipe action, and a combination of each, among others.

In a diagram 111 of FIG. 1B, the communication application 112 (executing in a server 118) may interact with an analysis service 119 to analyze the communication 116 and a previous communication related to the communication 116 through an item 124 that may be a common content within the communications. The analysis service 119 may include a third party service provider. Furthermore, the analysis service 119 may execute operations to classify the item 124 as an item of interest to a recipient of the communication 116.

The communication application 112 may remove private information from any interaction with the analysis service 119 to anonymize data transmitted to the analysis service 119. The analysis service 119 may transmit an identified item of interest to the communication application 112. In response, the communication application 112 may add the communication 116 to a list of communications to be presented with an emphasis at a client application. The communication application 112 may prompt the client application to emphasize the communication to alert the recipient about an offer associated with the item 124 to help the recipient acquire the item 124.

While the example systems in FIG. 1A through 1B have been described with specific components including the server 108, the communication application 102, embodiments are not limited to these components or system configurations and can be implemented with other system configuration employing fewer or additional components.

Figure 2:
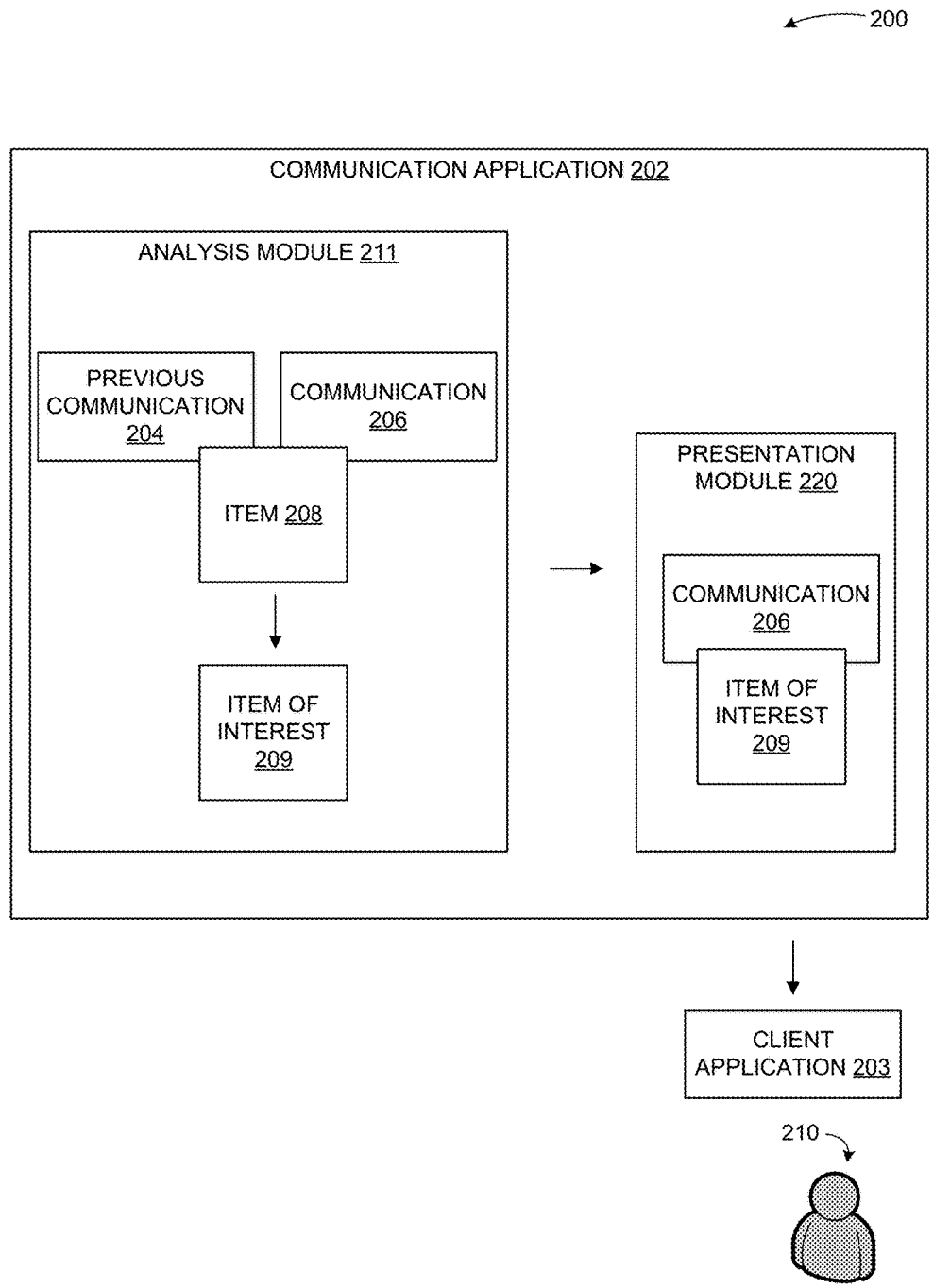
FIG. 2 is a display diagram illustrating example components of a communication application that emphasizes a communication based on past interaction related to promoted items, according to embodiments.

FIG. 2 is a display diagram illustrating example components of a communication application that emphasizes a communication based on past interaction related to promoted items, according to embodiments.

In a diagram 200, a communication application 202 may classify an item 208 (located within a content of a communication 206) as an item of interest 209 to a recipient 210. Operations to classify the item 208 may initiate when an analysis module 211 of the communication application 202 may receive the communication 206 from a provider of the item 208. A previous communication 204 that includes an order confirmation or a shipping confirmation associated with a previous purchase of the item 208 may be analyzed to classify the item 208 as an item of interest 209. For example, a frequency associated with a purchase of the item 208 may be identified. The frequency may be computed based on a duration between the previous communication 204 and another communication that includes another order and/or shipping confirmation of the item 208. If the frequency exceeds a threshold value (which may be configurable by the recipient 210 or another entity with a stake in interests of the recipient 210), the item 208 may be classified as the item of interest 209.

In another example scenario, the analysis module 211 may classify the item 208 as the item of interest 209 based on a spending amount associated with a purchase of the item 208. The spending amount may be parsed from the previous communication 204 which may include an ordering and/or shipping confirmation. Similar to the frequency example, if the spending amount is deemed to exceed a threshold value (which may also be configurable by the recipient and/or another entity with a stake in interests of the recipient 210), the item 208 may be classified as the item of interest 209.

Furthermore, the analysis module 211 may classify the item 208 as the item of interest 209 based on a timing of previous purchase of the item parsed from the previous communication 204. The timing may match a relevant timing to the recipient 210 such as an occasion that includes a special event (such as a retirement), and/or a repeating event (such as birthday, anniversary, among others). The repeating event may also include a repeated need to purchase consumables based on a recurring timeframe associated with the recipient 210 extracted from the previous communication 204 or other past communication(s) associated with a history of purchase of the recipient 210. Moreover, the analysis module 211 may also detect a completion of a repeat purchase for the item 208 by the recipient 210 from the provider or other providers analyzed from the previous communication 204 or other previous communication(s). As a result, the item 208 may be classified as the item of interest 209 because the recipient's interest in re-purchasing the item 208 qualifies the item 208 as the item of interest 209.

Upon classifying the item 208 as an item of interest 209 the analysis module may transmit the communication 206 and the item of interest 209 to a presentation module 220. The presentation module 220 may provide the communication 206 to a client application 203 to emphasize the communication 206 to the recipient 210. The communication 206 may be emphasized to alert the recipient 210 to an offer within the communication 206 related to the item of interest 209. The offer may help the recipient acquire the item of interest 209. Examples of the offer may include a sale notification, a discount notification, a payment plan notification, a new item availability, and/or an existing item that is back in stock, among others.

Figure 3:
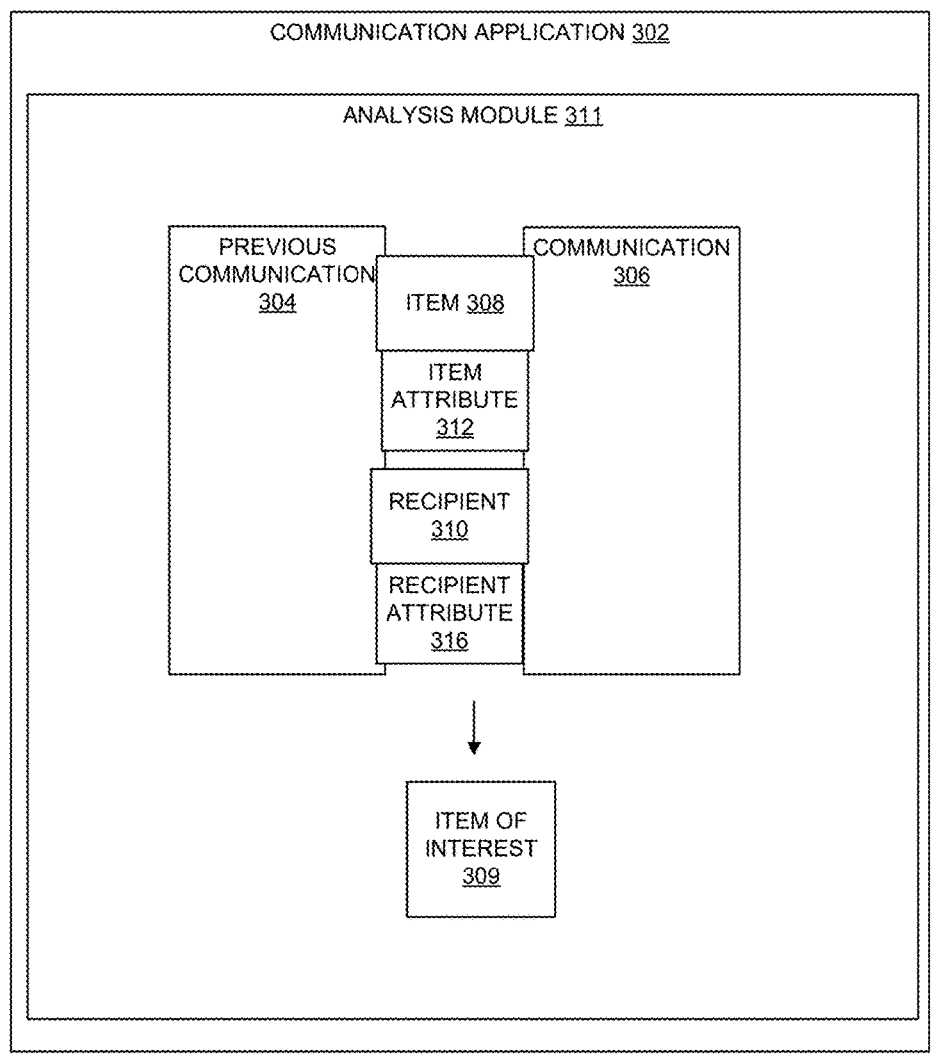
FIG. 3 is a display diagram illustrating components of a scheme to emphasize a communication based on past interaction related to promoted items, according to embodiments.

FIG. 3 is a display diagram illustrating components of a scheme to emphasize a communication based on past interaction related to promoted items, according to embodiments.

In a diagram 300, an analysis module 311 of a communication application 302 may classify an item 308 as an item of interest 309. The item 308 may be described within a communication 306. The item 308 may be classified as the item of interest 309 based on a sale and/or shipping confirmation of the item 308 within a previous communication 304, an item attribute 312, and/or a recipient attribute 316.

In an example scenario, the analysis module 311 of the communication application 302 may identify another item associated with the item of interest 309 for the recipient based on the previous communication 304. The other item may be described within the content of the previous communication 304 (such as a description of another product purchased along with the item of interest 309). The other item may also be identified based on the recipient attribute 316 that may be shared with the item 308 such as a gender, age, and income level of the recipient 310. Next, the other communication may be assigned to a list of communications to be emphasized in association with the other item based on an interest of the recipient 314 detected in relation to the other item. For example, the other item may be a consumable such as a component of the item 308 that may be replaced upon consumption by the item 308. In such a scenario, an expected purchase timing range for the item may be determined based on the previous communication 304 or other previous communication(s) that include an order and/or a shipment confirmation associated with the other item.

Figure 4:
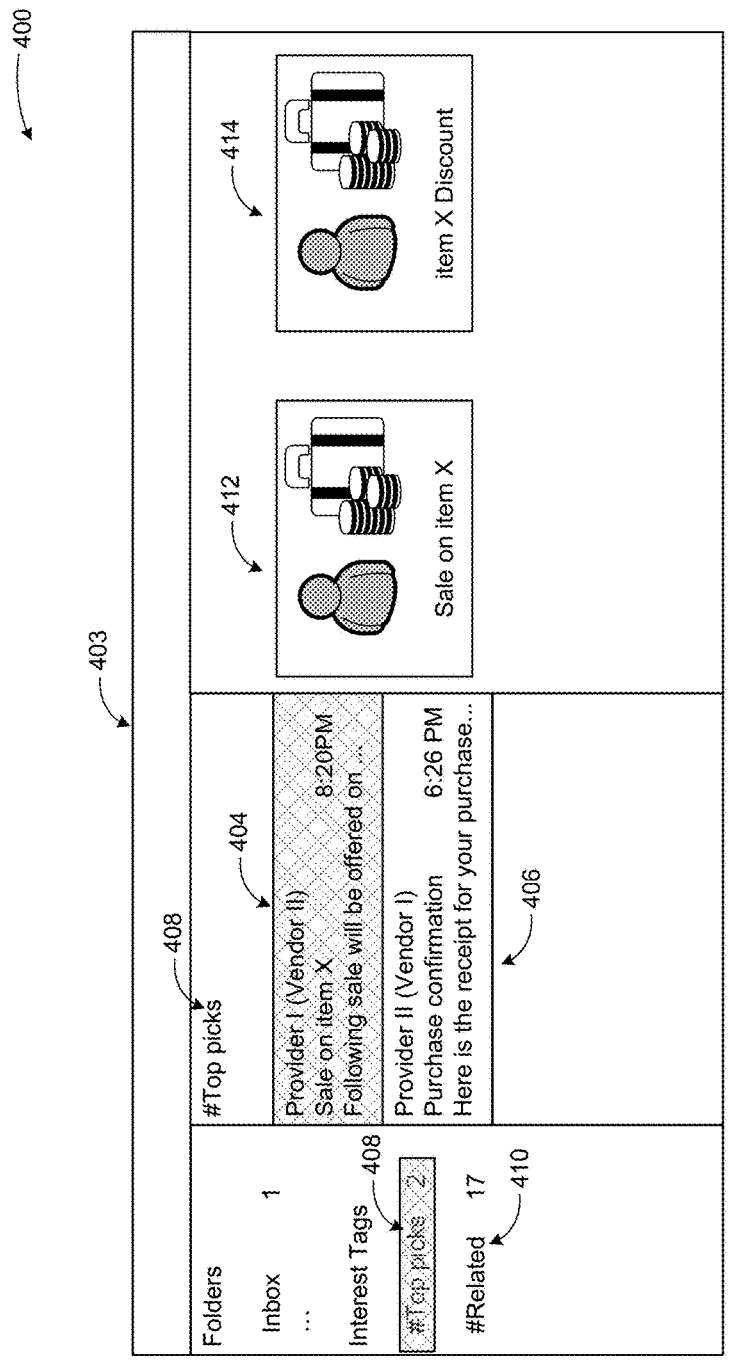
FIG. 4 is a display diagram illustrating an example interface that emphasizes a communication based on past interaction related to promoted items, according to embodiments.

FIG. 4 is a display diagram illustrating an example interface that emphasizes a communication based on past interaction related to promoted items, according to embodiments.

In a diagram 400, a communication application 402 may provide a communication 404 to a client application 403 for display to a recipient with an emphasis. The communication application 402 may provide a client interface to the client application 403 for rendering. Alternatively, the communication application may provider interface elements such as data for rendering by the client application 403.

The communication application 402 may instruct the client application 403 to place the communication 404 within an interest category 408. The communication 404 may be placed into the interest category 408 by linking the communication 404 with a tag that establishes a classification into the interest category 408. The communication 404 may also be classified with another category tag 410 based on another interest of the recipient (such as a purchase of the item when the item's price falls below a threshold value).

The client application may be instructed to display the communication 404 and a previous communication 406 (that includes an order and/or a shipping confirmation of a past purchase of the item) within a section of the user interface reserved for the interest category 408. Furthermore, the communication application may prompt the client application 403 to emphasize the communication 404 to be displayed as a graphic, an image, and/or an animation, among others within an interface element 412. Another interface element 414 may also be displayed to emphasize an additional offer associated with the item from the provider and/or another provider. The client application 403 may also be instructed to display the communication 404 as a pop-up message, an email communication, an online conference communication, and/or an instant message, among others within an interface element 412 (or an interface element 414).

In an example scenario, the communication application may detect a self-purchase, a purchase for an occasion, an association with a travel, and/or an online purchase as the attribute associated with the recipient. The attribute associated with the recipient may be parsed from the previous communication 406. Upon detecting the recipient attribute, the item may be classified as item of interest for the recipient. Similarly, a purchase frequency and/or a purchase habit, among others parsed from the previous communication may be analyzed to determine a relevancy of the attribute associated with the recipient. If the attribute is determined as relevant (described as the recipient having an interest in the item because of the attribute), the item may be classified as an item of interest.

Furthermore, the communication application may analyze a onetime purchasable, a consumable, and/or an owner customization as the attribute associated with the item. The attribute may be parsed from the previous communication 406. In response to a relevancy determination of the attribute, the item may be classified as the item of interest for the recipient.

As discussed above, the communication application may be employed to perform operations to automate emphasizing a communication based on past interaction related to promoted items. An increased user efficiency with the client application may occur as a result of analyzing a previous communication through the communication application 102 to identify an item of interest. Additionally, processing the communication, and attributes for the item, and the recipient, by the communication application 102, may reduce processor load, increase processing speed, conserve memory, and reduce network bandwidth usage.

Embodiments, as described herein, address a need that arises from a lack of efficiency to emphasize a communication based on past interaction related to promoted items. The actions/operations described herein are not a mere use of a computer, but address results that are a direct consequence of software used as a service offered to large numbers of users and applications.

The example scenarios and schemas in FIG. 1A through 4 are shown with specific components, data types, and configurations. Embodiments are not limited to systems according to these example configurations. Emphasizing a communication based on past interaction related to promoted items may be implemented in configurations employing fewer or additional components in applications and user interfaces. Furthermore, the example schema and components shown in FIG. 1A through 4 and their subcomponents may be implemented in a similar manner with other values using the principles described herein.

Figure 5:
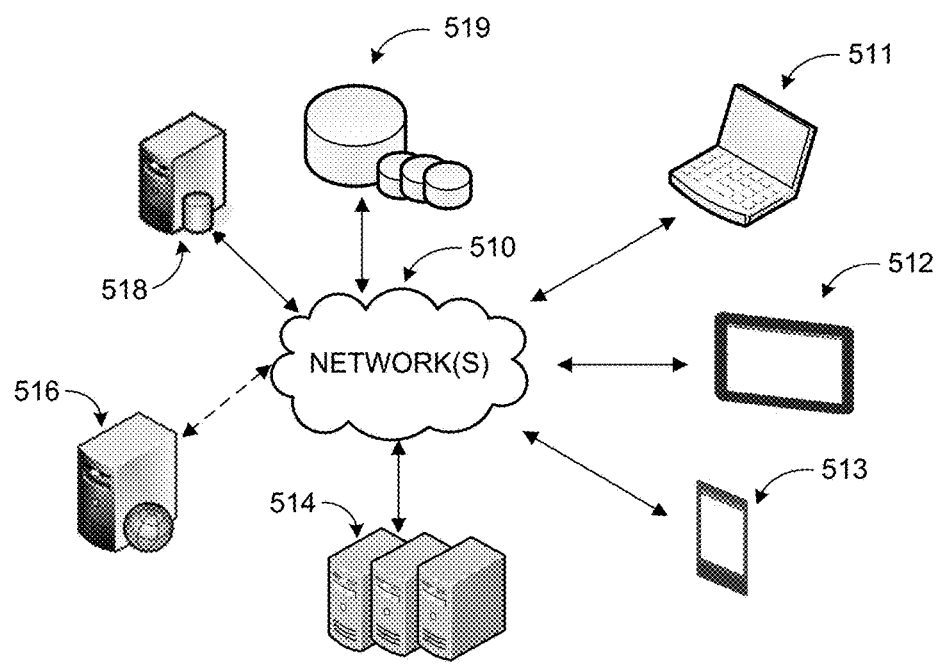
FIG. 5 is a simplified networked environment, where a system according to embodiments may be implemented.

FIG. 5 is an example networked environment, where embodiments may be implemented. A communication application configured to emphasize a communication based on past interaction related to promoted items may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication application may process a previous communication associated with an item in response to receiving a communication from a provider associated with the item. The previous communication may include an order and/or a shipping confirmation associated with a past purchase of the item. Next, the item may be identified as an item of interest based on the previous communication, a recipient attribute, and/or an item attribute. The communication may be assigned to a list of communications to be emphasized. Furthermore, the communication may be provided to a client application to be presented to a recipient with an emphasis. The communication application may store data associated with the item in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to emphasize a communication based on past interaction related to promoted items. Furthermore, the networked environments discussed in FIG. 5 are for illustration purposes only. Embodiments are not limited to the example applications, modules, or processes.

Figure 6:
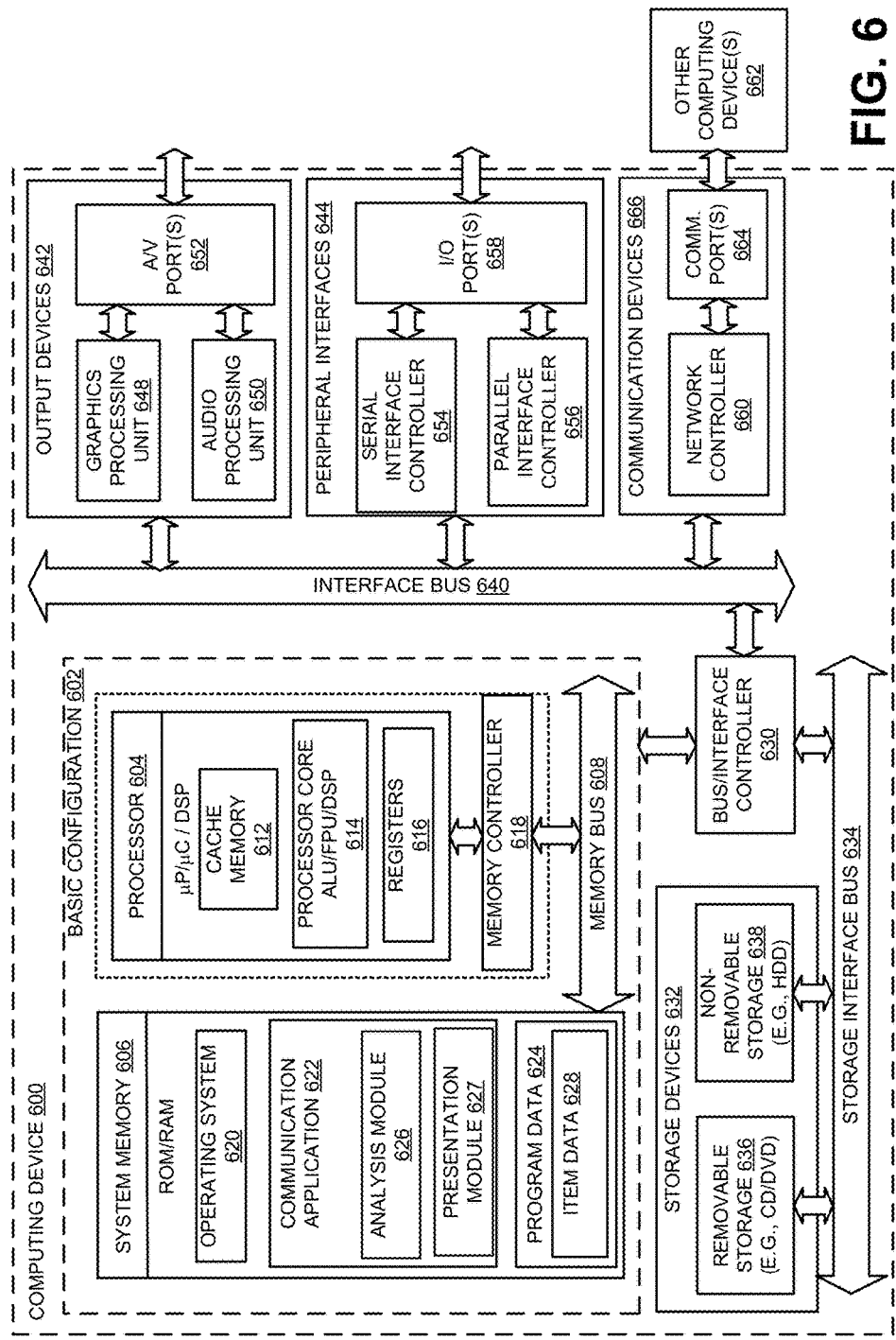
FIG. 6 is a block diagram of an example computing device, which may be used to emphasize a communication based on past interaction related to promoted items, according to embodiments.

FIG. 6 is a block diagram of an example computing device, which may be used to emphasize a communication based on past interaction related to promoted items, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 may include components such as an analysis module 626 and a presentation module 627. The analysis module 626 and the processing module 627 may execute the processes associated with the communication application 622. The analysis module 626 may process a previous communication associated with an item in response to receiving a communication from a provider associated with the item. The previous communication may include an order and/or a shipping confirmation associated with a past purchase of the item. Next, the item may be identified as an item of interest based on the previous communication, a recipient attribute, and/or an item attribute. The communication may be assigned to a list of communications to be emphasized. The presentation module 627 may provide the communication to a client application to be presented to a recipient with an emphasis.

Input to and output out of the communication application 622 may be transmitted through a communication device associated with the computing device 600. An example of the communication device may include a networking device that may be communicatively coupled to the computing device 600. The networking device may provide wired and/or wireless communication. The program data 624 may also include, among other data, item data 628, or the like, as described herein. The item data 628 may include recipient attribute and item attribute, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to emphasize a communication based on a past interaction related to promoted items. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
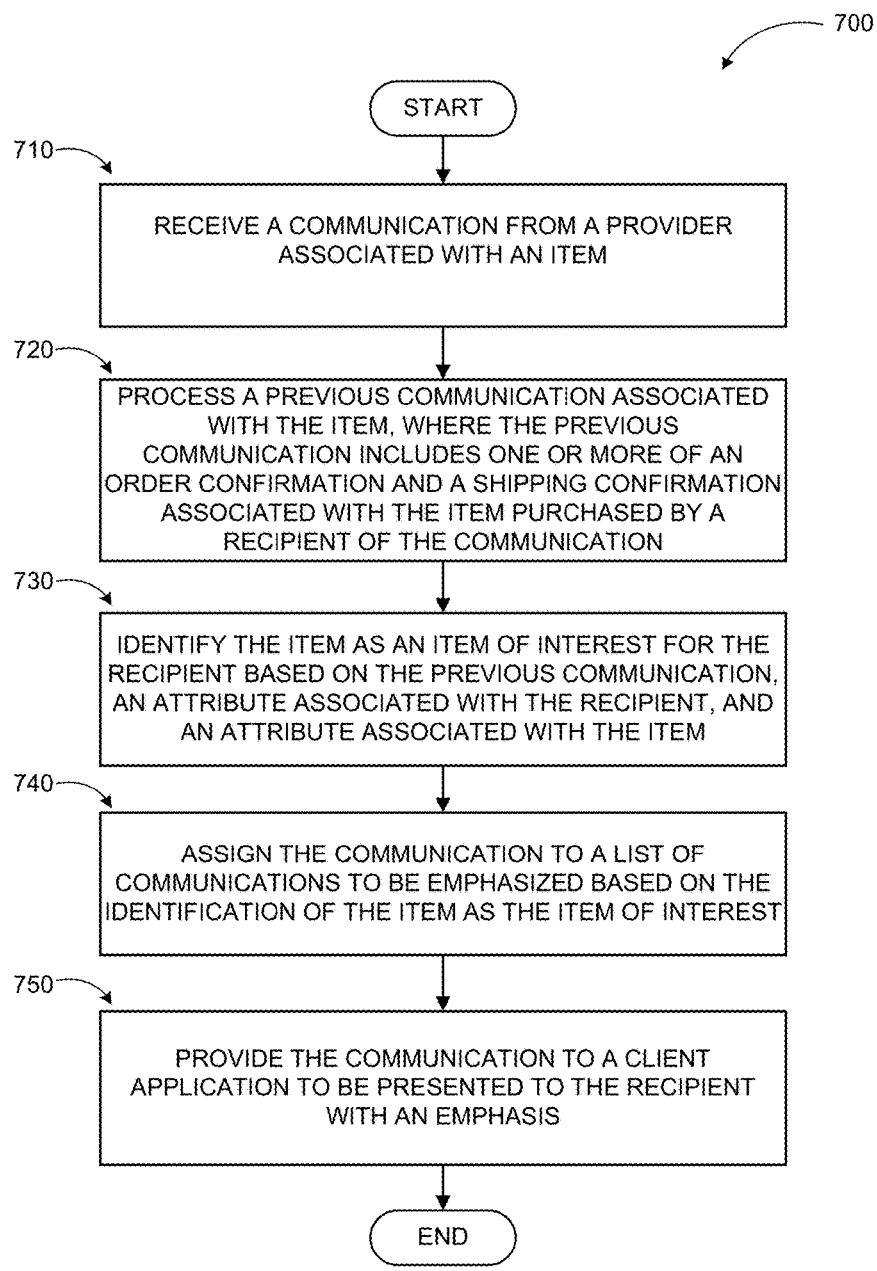
FIG. 7 is a logic flow diagram illustrating a process for emphasizing a communication based on past interaction related to promoted items, according to embodiments.

FIG. 7 is a logic flow diagram illustrating a process for emphasizing a communication based on past interaction related to promoted items, according to embodiments. Process 700 may be implemented on a computing device, such as the computing device 600 or another system.

Process 700 begins with operation 710, where the communication application receives a communication from a provider associated with an item. Next, at operation 720, a previous communication associated with the item may be processed. The previous communication may include an order and/or shipping confirmation associated with a past purchase of the item by a recipient of the communication. At operation 730, the item may be identified as an item of interest for the recipient based on the previous communication, a recipient attribute, and/or an item attribute.

At operation 740, the communication may be assigned to a list of communications to be emphasized based on the identification of the item of interest. The communication may be provided to a client application to be presented with an emphasis at operation 750.

The operations included in process 700 are for illustration purposes. Emphasizing a communication based on a past interaction related to promoted items may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a server to emphasize a communication is described. The server includes a communication device, a memory configured to store instructions associated with a communication application, and processor(s) coupled to the memory and the communication device. The processor(s) execute the communication application in conjunction with the instructions stored in the memory. The communication application includes an analysis module and a presentation module. The analysis module is configured to receive, through the communication device, a communication from a provider associated with an item, process a previous communication associated with the item, where the previous communication includes one or more of an order confirmation and a shipping confirmation associated with the item purchased by a recipient of the communication, identify the item as an item of interest for the recipient based on the previous communication, an attribute associated with the recipient, and an attribute associated with the item, and assign the communication to a list of communications to be emphasized based on the identification of the item as the item of interest. The presentation module is configured to provide, through the communication device, the communication to a client application to be presented to the recipient with an emphasis.

In other examples, the analysis module is further configured to identify a frequency of a purchase of the item by the recipient based on a duration between the previous communication and another communication with another order confirmation or another shipping confirmation of the item and classify the item as the item of interest in response to detecting the frequency exceeding a first threshold value. The analysis module is further configured to detect a spending amount of a purchase of the item from the previous communication and identify the item as the item of interest in response to detecting the spending amount exceeding a second threshold value. The analysis module is further configured to identify a timing of a purchase of the item from the previous communication and classify the item as the item of interest in response to detecting the timing of the purchase match a relevant timing range.

In further examples, the analysis module is further configured to detect the recipient's completion of a repeat purchase for the item from the provider or other providers of the item from the previous communication and other communications and classify the item as the item of interest. The analysis module is further configured to analyze the communication to identify an offer associated with the item, where the offer includes instructions to help with a purchase of the item and classify the item as the item of interest in response to identifying the offer within the communication. The offer includes one or more of a sale notification, a discount notification, and a payment plan notification associated with the item.

In other examples, the analysis module is further configured to identify a second item associated with the item as the item of interest for the recipient based on the previous communication, the attribute associated with the recipient, and the attribute associated with the item and assign a received communication associated with the second item to the list of communications to be emphasized based on the identification of the second item as the item of interest. The second item is a consumable item. The analysis module is further configured to determine an expected purchase timing range for the second item and assign the received communication associated with the second item to the list of communications to be emphasized based on the expected purchase timing range for the second item. The analysis module is further configured to prompt the client application to place the communication within an interest category.

In some examples a method executed on a computing device to emphasize a communication is described. The method includes receiving a communication from a provider associated with an item, processing a previous communication associated with the item, where the previous communication includes one or more of an order confirmation and a shipping confirmation associated with the item purchased by a recipient of the communication, identifying the item as an item of interest for the recipient based on the previous communication, an attribute associated with the recipient, and an attribute associated with the item, assigning the communication to a list of communications to be emphasized based on the identification of the item as the item of interest, and providing the communication to a client application to be presented to the recipient with an emphasis.

In other examples, the method further includes detecting a self-purchase, a purchase for an occasion, an association with a travel, an online purchase as the attribute associated with the recipient that is parsed from the previous communication and classifying the item as the item of interest for the recipient. The method further includes analyzing one or more of a purchase frequency and one or more purchase habits as the attribute associated with the recipient that is parsed from the previous communication and in response to a relevancy determination of the attribute associated with the recipient, classifying the item as the item of interest for the recipient.

In further examples, the method further includes processing one or more a gender of the recipient, an age of the recipient and an income level of the recipient as the attribute associated with the recipient that is parsed from the previous communication and in response to a relevancy determination of the attribute associated with the recipient, classifying the item as the item of interest for the recipient. The method further includes analyzing one or more of a onetime purchasable, a consumable, and an owner customization as the attribute associated with the item that is parsed from the previous communication and in response to a relevancy determination of the attribute associated with the item, classifying the item as the item of interest for the recipient. The method further includes instructing the client application to display the communication as one or more of a pop-up message, an email communication, an online conference communication, and an instant message communication.

In some examples a computer-readable memory device with instructions stored thereon to emphasize a communication is described. The instructions includes actions that are similar to actions of the method. The instructions further include identifying one or more of a brand associated with the item and the provider within the previous communication and classifying the item as the item of interest in response to detecting one or more of the brand and the provider match an interest of the recipient based on one or more of a spending habit and a spending history of the recipient. The instructions further include instructing the client application to display the communication as one or more of a pop-up message, an email communication, an online conference communication, and an instant message communication within another communication that is presently viewed by the recipient.

In some examples a means for emphasizing a communication is described. The means for emphasizing the communication includes a means for receiving a communication from a provider associated with an item, a means for processing a previous communication associated with the item, where the previous communication includes one or more of an order confirmation and a shipping confirmation associated with the item purchased by a recipient of the communication, a means for identifying the item as an item of interest for the recipient based on the previous communication, an attribute associated with the recipient, and an attribute associated with the item, a means for assigning the communication to a list of communications to be emphasized based on the identification of the item as the item of interest, and a means for providing the communication to a client application to be presented to the recipient with an emphasis.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server to emphasize a communication, the server comprising:
 a communication device;
 a memory configured to store instructions associated with a communication application;
 one or more processors coupled to the memory and the communication device, the one or more processors executing the communication application in conjunction with the instructions stored in the memory, wherein the communication application includes:
  an analysis module configured to:
   receive, through the communication device, an electronic communication from a provider sent to a recipient, the electronic communication associated with an item;
   after receiving the electronic communication from the provider sent to the recipient, process previously-received communications exchanged with the recipient to determine a previous communication associated with the item exchanged with the recipient, wherein the previous communication includes one or more of an order confirmation and a shipping confirmation associated with the item purchased by the recipient of the electronic communication;
   identify the item as an item of interest for the recipient based on the previous communication, an attribute associated with the recipient, and an attribute associated with the item; and
   assign the electronic communication to a list of communications to be emphasized based on the identification of the item as the item of interest; and
  a presentation module configured to:
   provide, through the communication device, the electronic communication to a client application to be presented to the recipient with an emphasis, wherein the emphasis includes displaying the electronic communication with the previous communication in a user interface in a section of the user interface reserved for emphasized communications sent to the recipient to distinguish the electronic communication from other communications sent to the recipient.

2. The server of claim 1, wherein the analysis module is further configured to:
 identify a frequency of a purchase of the item by the recipient based on a duration between the previous communication and another communication with another order confirmation or another shipping confirmation of the item; and
 classify the item as the item of interest in response to detecting the frequency exceeding a first threshold value.

3. The server of claim 1, wherein the analysis module is further configured to:

detect a spending amount of a purchase of the item from the previous communication; and identify the item as the item of interest in response to detecting the spending amount exceeding a second threshold value.

4. The server of claim 1, wherein the analysis module is further configured to:

identify a timing of a purchase of the item from the previous communication; and classify the item as the item of interest in response to detecting the timing of the purchase matching a relevant timing range.

5. The server of claim 1, wherein the analysis module is further configured to:

detect the recipient's completion of a repeat purchase for the item from the provider or other providers of the item from the previous communication and other communications; and classify the item as the item of interest.

6. The server of claim 1, wherein the analysis module is further configured to:

analyze the electronic communication to identify an offer associated with the item, wherein the offer includes instructions to help with a purchase of the item; and classify the item as the item of interest in response to identifying the offer within the electronic communication.

7. The server of claim 6, wherein the offer includes one or more of a sale notification, a discount notification, and a payment plan notification associated with the item.

8. The server of claim 1, wherein the analysis module is further configured to:

identify a second item associated with the item as the item of interest for the recipient based on the previous communication, the attribute associated with the recipient, and the attribute associated with the item; and assign a received communication associated with the second item to the list of communications to be emphasized based on the identification of the second item as the item of interest.

9. The server of claim 8, wherein the second item is a consumable item.

10. The server of claim 9, wherein the analysis module is further configured to:

determine an expected purchase timing range for the second item; and assign the received communication associated with the second item to the list of communications to be emphasized based on the expected purchase timing range for the second item.

11. The server of claim 1, wherein the presentation module is further configured to:

prompt the client application to place the electronic communication within an interest category.

12. A method executed on a computing device to emphasize a communication, the method comprising:

receiving an electronic communication from a provider sent to a recipient, the electronic communication associated with an item;

after receiving the electronic communication from the provider sent to the recipient, processing previously-received communications exchanged with the recipient to determine a previous communication associated with the item exchanged with the recipient, wherein the previous communication includes one or more of an order confirmation and a shipping confirmation associated with the item purchased by the recipient of the communication;

identifying the item as an item of interest for the recipient based on the previous communication, an attribute associated with the recipient, and an attribute associated with the item;

assigning the electronic communication to a list of communications to be emphasized based on the identification of the item as the item of interest; and providing the electronic communication to a client application to be presented to the recipient with an emphasis, wherein the emphasis includes displaying the electronic communication in a user interface in a section of the user interface reserved for emphasized communications sent to the recipient to distinguish the electronic communication from other communications sent to the recipient.

13. The method of claim 12, further comprising:

detecting a self-purchase, a purchase for an occasion, an association with a travel, an online purchase as the attribute associated with the recipient that is parsed from the previous communication; and classifying the item as the item of interest for the recipient.

14. The method of claim 12, further comprising:

analyzing one or more of a purchase frequency and one or more purchase habits as the attribute associated with the recipient that is parsed from the previous communication; and in response to a relevancy determination of the attribute associated with the recipient, classifying the item as the item of interest for the recipient.

15. The method of claim 12, further comprising:

processing one or more a gender of the recipient, an age of the recipient and an income level of the recipient as the attribute associated with the recipient that is parsed from the previous communication; and in response to a relevancy determination of the attribute associated with the recipient, classifying the item as the item of interest for the recipient.

16. The method of claim 12, further comprising:

analyzing one or more of a onetime purchasable, a consumable, and an owner customization as the attribute associated with the item that is parsed from the previous communication; and in response to a relevancy determination of the attribute associated with the item, classifying the item as the item of interest for the recipient.

17. The method of claim 12, further comprising:

instructing the client application to display the electronic communication as one or more of a pop-up message, an email communication, an online conference communication, and an instant message communication.

18. A computer-readable memory device with instructions stored thereon to emphasize a communication, the instructions comprising:

receiving an electronic communication from a provider sent to a recipient, the electronic communication associated with an item;

after receiving the electronic communication from the provider sent to the recipient, processing previously-received communications exchanged with the recipient to determine a previous communication associated with the item exchanged with the recipient, wherein the previous communication includes one or more of an order confirmation and a shipping confirmation associated with the item purchased by the recipient of the communication;

identifying the item as an item of interest for the recipient based on the previous communication, an attribute associated with the recipient, and an attribute associated with the item;

assigning the electronic communication to a list of communications to be emphasized based on the identification of the item as the item of interest; and providing the electronic communication to a client application to be presented to the recipient with an emphasis, wherein the emphasis includes displaying the electronic communication in a user interface in a section of the user interface reserved for emphasized communications sent to the recipient to distinguish the electronic communication from other communications sent to the recipient.

19. The computer-readable memory device of claim 18, wherein the instructions further comprise:
   identifying one or more of a brand associated with the item and the provider within the previous communication; and
   classifying the item as the item of interest in response to detecting one or more of the brand and the provider match an interest of the recipient based on one or more of a spending habit and a spending history of the recipient.

20. The computer-readable memory device of claim 18, wherein the instructions further comprise:
   instructing the client application to display the electronic communication as one or more of a pop-up message, an email communication, an online conference communication, and an instant message communication within another communication that is presently viewed by the recipient.

* * * * *